AUTOMATIC TELEPHONE SYSTEM

Filed Oct. 31, 1951 3 Sheets-Sheet 1

INVENTOR.
THEODOR FRANKEL
BY
T. L. Bowes
ATTORNEY

INCOMING TRUNK CIRCUIT

INVENTOR.
THEODOR FRANKEL
BY T. L. Bowes
ATTORNEY

INVENTOR.
THEODOR FRANKEL
BY T. L. Bowes
ATTORNEY

United States Patent Office 2,734,947

Patented Feb. 14, 1956

2,734,947

AUTOMATIC TELEPHONE SYSTEM

Theodor Frankel, Rochester, N. Y., assignor, by mesne assignments, to General Dynamics Corporation, a corporation of Delaware Application October 31, 1951, Serial No. 254,110

2 Claims. (Cl. 179—27)

Figure 1:
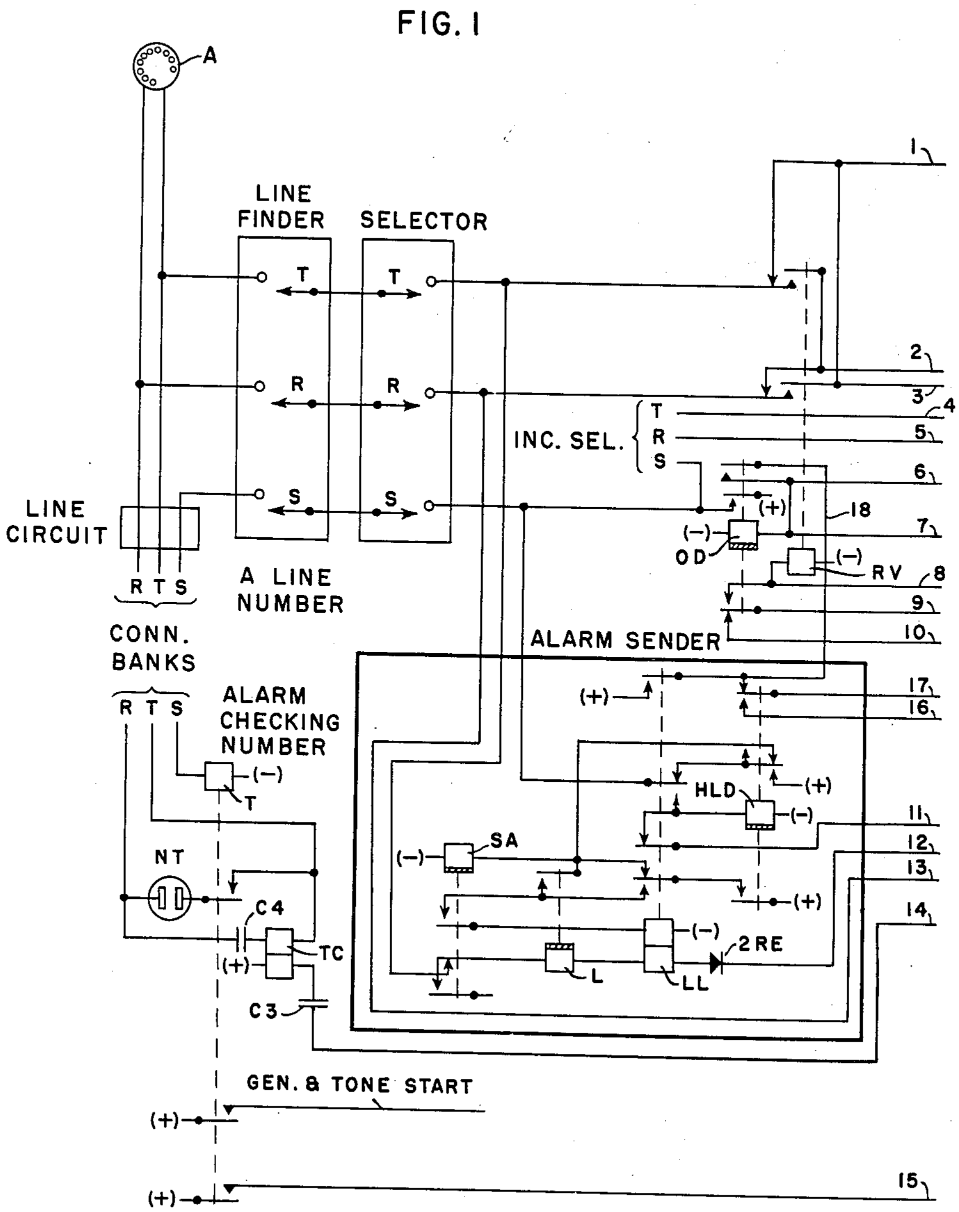

This invention relates to multi-office telephone systems and it more particularly pertains to multi-office systems which include one or more unattended automatic offices and it is concerned primarily with improved circuits for supervising the unattended offices. A system of this type is shown in the copending application of Theodor Frankel, Serial No. 42,092, filed August 2,1948, of which the present invention is a continuation-in-part.

It is the usual procedure in systems of the above type to provide switching apparatus which, in response to an unstandard condition in an unattended office, transmits an alarm signal to an attended office over one of the inter-office trunk lines. In some cases the alarm signal is transmitted over a regular trunk circuit when this trunk circuit is not in use for a telephone call and in other cases the alarm signal is transmitted over a separate trunk conductor not used for other services. The present invention is concerned with systems of the first mentioned type, that is, where alarm signals are transmitted over a regular inter-office trunk.

The main object of the present invention is the provision of means for transmitting an alarm from an unattended dial office to an attended manual or dial office, in which the transmitted alarm signal is of a different character from the regular calling signal transmitted over the inter-office trunk.

Another object of the present invention is the provision of means of the kind just referred to in which the transmission of the distinctive alarm signal is interrupted in response to the answering of the alarm call by the operator in the attended office but in which precautions are taken for preventing the alarm indication from getting lost in case the operator fails to identify the alarm call as such.

In this connection it is another object of the invention to provide means for causing the transmission of the alarm signal to be resumed upon the withdrawal of the operator from the trunk provided the abnormal condition has not ceased to exist and provided the alarm equipment has not been re-set in the meantime.

Another object of the invention is the provision in a repeater of means which when the repeater has been seized over one path of access operates to hold the preceding equipment until both the calling end and the called end has cleared but which when the repeater has been seized over another path of access is rendered independent of the condition of the called end.

It is a further object of the invention to provide in an unattended exchange a two-way trunk circuit of the CLR holding type which when seized by an alarm sender is arranged to transmit an alarm signal over the associated trunk to the attended exchange and is further arranged so that the operator may dial an alarm checking number back over the trunk without first withdrawing from that trunk.

More specifically, it is an object of the present invention to provide in an unattended exchange a two-way trunk circuit of the aforementioned type having means which upon the answering of the alarm call by the operator cause the operation of the alarm sender to be interrupted and the incoming branch circuit of the trunk circuit to be effectively connected to the trunk.

The various features of the invention, together with the operation of a system embodying the same, will be described in detail hereinafter, reference being had to the accompanying drawings comprising Figs. 1 and 2, which disclose sufficient portions of an inter-office trunk circuit and the alarm sending and checking equipment to enable one skilled in the art to understand the operation of the system.

Figure 3:
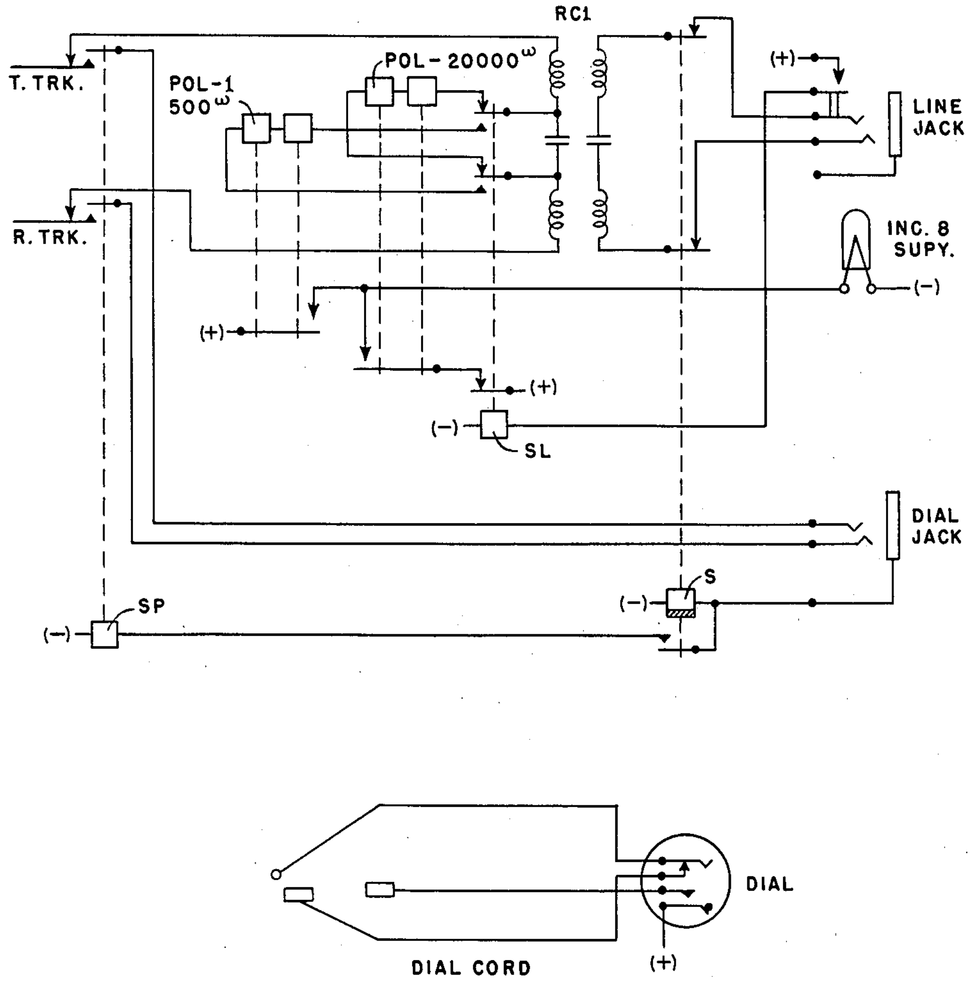
Figure 2:
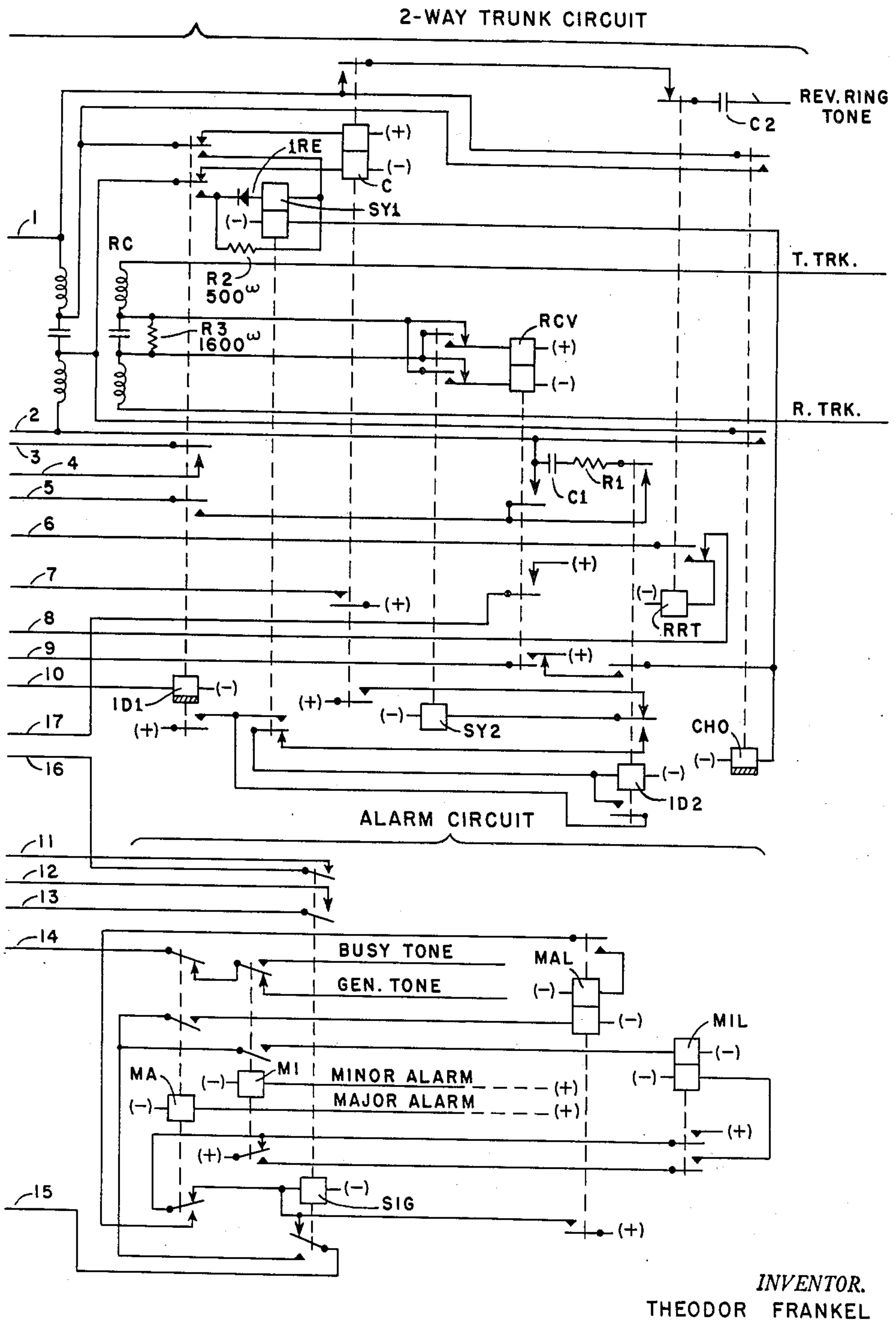

Figs. 1 and 2 show the switching apparatus at an unattended exchange and Fig. 3 shows the equipment at an attended manual exchange or toll switchboard associated with a trunk line extending to the unattended exchange shown in Figs. 1 and 2.

Referring to Fig. 1, the various circuits shown in this Figure are assumed to be in one of the unattended dial offices which is connected by at least one trunk line to an attended office, the latter office may be manually operated or it may include a manual switchbord.

In the unattended office a dial telephone line having one or more dial stations connected thereto, one of which is indicated at A, is connected to an associated line circuit, this line circuit being arranged to extend a connection from a calling substation, such as substation A, by way of a line finder to a selector. When the calling line is extended to the selector, the two way trunk circuit leading to the distant attended office may be selected by dialing a particular trunk level digit for selecting the illustrated trunk circuit. The line finder and selector are illustrated in diagrammatic form, since these units of the system may be of any conventional form.

The line terminals are also connected to connector banks, as illustrated, in order that this line may be called by way of a connector for establishing connections to the illustrated line. Connector bank terminals are also illustrated as being connected to an alarm checking number, whereby the operator at the distant office may dial this number and determine, by means of tones transmitted over the connection, the condition of the apparatus in the unattended office, all which will be pointed out in the description which follows.

The two way trunk circuit associated with the trunk leading to the distant attended office is illustrated in the upper portion of Fig. 2. The alarm circuit, whereby an unstandard condition is effective to release one or more relays to indicate a particular alarm condition, is shown in the lower portion of Fig. 2. Within the heavy line rectangle an alarm sender is shown, this portion of the system being more particularly illustrative of the main feature of the present invention. The detailed operation of this alarm sender will be explained in detail hereinafter.

Fig. 3 illustrates the incoming trunk circuit connected to the trunk line associated with the two way trunk circuit illustrated in Fig. 2. This incoming trunk circuit terminates in a line jack and in a dial jack at the operator's position. An incoming call is answered by the operator plugging an answering cord (not shown) into the line jack in response to the lighting of the incoming lamp. An outgoing call is set up by the operator plugging a calling cord (not shown) into the line jack, then plugging the dial cord into the dial jack and dialing the desired number, after which the dial cord is removed from the dial jack and may be used in connection with other calls.

The operation of the various circuits will now be described in detail to better illustrate the various features of the invention, particular reference being had to the alarm sender in Fig. 1 to which the main feature of the present invention is directed.

A call from the attended office to the unattended office will first be described. When the operator inserts the calling plug (not shown) into the line jack, the local contact of this jack closes an obvious circuit for operating sleeve relay SL. The trunk line is normally energized at a low level over a circuit which may be traced from (+), upper winding of relay RCV of the two-way trunk circuit, break contact of supervisory relay SY2, upper right hand winding of the repeating coil RC, tip trunk conductor T. TRK., break contact of sleeve repeating relay SP, upper left hand winding of repeating coil RC1, break contact of relay SL, windings of polarized relay POL, break contact of relay SL, lower left hand winding of coil RC1, break contact of relay SP, ring trunk conductor R. TRK., lower right hand winding of coil RC, break contact of relay SY2 and lower winding of relay RCV to (−). Since the windings of relay POL are of very high resistance, there is insufficient current flow over this circuit to operate relay RCV in the unattended office and since the current flow is in the direction above traced, relay POL is not operated.

When relay SL is operated, as above described, the above circuit including the trunk conductors is switched from relay POL to the comparatively low resistance windings of relay POL1, thus energizing the trunk at a comparatively high level, and since the current is in the proper direction for operating relay POL1, this relay will operate and close an obvious circuit for lighting the incoming and supervisory lamp. The energization of the trunk circuit at this high level also effects the operation of relay RCV in the two way trunk circuit. A circuit is now closed for operating incoming delay relay ID1 extending from (+), make contact of relay RCV, conductor 9, break contact of outgoing delay relay OD, conductor 10, winding of relay ID1 to (−). Relay ID1 places a closed circuit across the tip and ring conductors T and R leading to the incoming selector which energizes this selector preparatory to the dialing of the first digit. This circuit may be traced from tip conductor T leading to the incoming selector INC. SEL., conductor 4, make contact of relay ID1, conductor 3, conductor 1, upper left hand winding of coil RC, make contact of relay ID1, upper winding of supervisory relay SY1, rectifier IRE, make contact of relay ID1, lower left hand winding of coil RC, make contact of relay RCV and make contact of relay ID1, conductor 5, to ring conductor R leading to the incoming selector. Although this incoming selector is not shown, it is obvious to those familiar with the automatic telephone art how such a selector is connected to the illustrated terminals for responding to the digits transmitted from the distant office. It is also well known that the relays of the incoming selector apply (+) potential to conductor S for making this particular trunk busy at the banks of the local selector for preventing trunk seizure on an outgoing call. This (+) potential also causes the operation of relay SA in the alarm sender to prevent seizure of the trunk by an alarm call as long as this trunk is busy in the incoming call as more fully described hereafter. The circuit for relay SA extends from (+) on conductor S, uppermost break contact of relay LL in the alarm sender, uppermost break contact of relay HLD, winding of relay SA to (−).

The current flow over the T and R conductors of the incoming selector through the upper winding of relay SY1 is in the proper direction for operating this relay, which in turn completes a circuit for operating incoming delay relay ID2, this circuit extending from (+), make contact of relay ID1, make contact of relay SY1 and winding of relay ID2 to (−). Relay ID2 closes a locking circuit for itself extending from (+), make contact of relay ID1, make contact and winding of relay ID2 to (−). At the uppermost make contact of relay ID2 a spark absorbing circuit, including the condenser C1 and resistor R1, is connected across the terminals of the lower, inner make contact of relay RCV to prevent sparking at this latter contact when RCV impulses the incoming circuit.

The operator hears the dial tone sent back from the incoming selector and inserts the dial cord into the dial jack. When the dial is operated from its normal position a circuit is closed from the off normal contact of the dial by way of the sleeve conductor of the cord and jack for operating sleeve relay S, this relay remaining operated until the dial has completed the impulsing transmission and is restored to normal. The operation of relay S extends this circuit to sleeve repeater relay SP for operating this relay, which in turn switches the trunk conductors from the repeating coil to the impulse contacts of the dial by way of the dial jack and cord. Opening up of the circuit to the repeat coil of the incoming trunk circuit de-energizes and releases relay POL1 for extinguishing the lamp. Now as the dial is restored to normal impulses are transmitted for opening and closing the trunk conductors, which in turn impulses relay RCV in the distant dial office. Each release of relay RCV opens up the above described circuit leading to the incoming selector and each operation of relay RCV again closes this incoming circuit. Consequently, the number dialed is re-transmitted to the automatic equipment in the dial office by relay RCV. Slow release relay ID1 is not released during this impulse transmission. Between digits relays SP and S are released and when the complete number is dialed the trunk circuit remains connected to the repeating coil circuit RC1.

Referring to the two way trunk circuit in Fig. 2, relay SY1 is energized over the incoming selector T and R conductors when relay RCV is energized and at each release of relay RCV, relay SY1 is held over a circuit extending from (+), break contact of relay RCV, make contact of relay ID2 and lower winding of relay SY1 to (−). By maintaining the lower winding of relay SY1 energized when its upper winding is de-energized, the release of this relay is prevented during impulsing. During the transmission of each digit, relay CHO is operated over a circuit extending from (+), break contact of relay RCV, make contact of relay ID2 and winding of relay CHO to (−). The two make contacts of relay CHO short circuit the two left hand windings of repeat coil RC to remove the impedance of these windings from the circuit to the incoming selector during impulse transmission. The continued operation of relay RCV holds the above described circuit to the winding of relay CHO open for a sufficiently long period to allow this latter relay to release.

When the called party in the unattended dial office answers the call, battery is reversed by the connector in the well known manner for reversing the direction of the current through the winding of relay SY1 for effecting the release of this relay. Resistor R2 is connected across the upper winding of relay SY1 and rectifier 1RE to provide a hold circuit for the connection to the automatic equipment when this battery reversal is effected and current flow through rectifier 1RE is stopped. The release of relay SY1 closes a circuit for operating relay SY2 extending from (+), make contact of relay ID1, make contact of relay ID2, break contact of relay SY1, make contact of relay ID2 and winding of relay SY2 to (−). The operation of relay SY2 reverses the current over the trunk conductors leading to the distant office for effecting the release of polar relay POL1 and the extinguishing of the supervisory lamp to indicate that the called party has answered.

When the conversation is terminated and the called party hangs up the receiver, the battery from the connector is restored to its normal direction for again operating relay SY1, which in turn opens up and releases relay SY2. The release of relay SY2 restores the current flow in the trunk to normal for operating relay POL1, which in turn lights the lamp as an indication that the called party has hung up the receiver.

When the operator takes down the connection, the removal of the plug from the line jack opens up and releases relay SL, which in turn transfers the trunk circuit from relay POL1 to relay POL for reducing the current in the trunk circuit to its normal low level and for releasing relay POL1. The release of relay POL1 extinguishes the supervisory lamp.

The energization of the trunk circuit at the low level reduces the current flow to the point where relay RCV is released for effecting the release of relay ID1. The release of relay RCV also releases the automatic equipment on the incoming portion of the connection by opening the lower, inner make contact of this relay. Removal of (+) from conductor S by the automatic equipment also permits relay SA in the alarm sender to release. Relay ID2 is released by the release of relay ID1, after which relay SY1 is released; this latter relay and relay CHO being operated (but without function) when relay RCV releases and closes the above described circuits to relays SY1 and CHO. The release of relay ID2 opens up and releases relays SY1 and CHO, thus restoring the circuits to normal.

It will now be explained how the circuits function on a call in the other direction, that is, from the dial office to the manual position in the distant office. When the calling subscriber removes the receiver to initiate a call, the calling line is extended by way of the line finder to the selector and when the number associated with the outgoing trunk is dialed the calling line is extended by way of the selector wipers and the selected contacts to the two way trunk circuit. A circuit is now closed for operating calling relay C of the two way trunk circuit extending from (+), upper winding of relay C, break contact of relay ID1, upper left hand winding of repeating coil RC, conductor 1, break contact of reversing relay RV, tip contacts and wipers T of the selector and finder, over the calling line circuit, ring contacts and wipers R of the finder and the selector, break contact of relay RV, conductor 2, lower left hand winding of coil RC, break contact of relay ID1 and lower winding of relay C to (−). Revertive ringing tone is now connected to the calling line as an indication that distant office trunk is being signaled, the tone extending from the common revertive ring tone conductor, condenser C2, break contact of revertive ringing tone relay RRT, make contact of relay C and over the above traced circuit to the calling line. Outgoing delay relay OD is operated over a circuit extending from (+), make contact of relay C, conductor 7, and winding of relay OD to (−). Relay OD applies (+) to the sleeve conductor S leading to the incoming selector, which performs no function on this type of call. This (+) potential is extended back to the sleeve wiper of the local selector and line finder for holding these switches in their operated positions and for holding the cut off relay of the calling line operated. The (+) potential on conductor S also brings about the operation of relay SA in the alarm sender whereby seizure of the trunk by an alarm call is prevented for the duration of the outgoing call, as will be more fully explained below.

Supervisory relay SY2 is now operated over a circuit extending from (+), make contact of relay C, break contact of relay ID2 and winding of relay SY2 to (−). The operation of relay SY2 reverses the low value current flow over the trunk leading to the distant office for operating relay POL in the incoming trunk circuit. The operation of relay POL closes a circuit for lighting the incoming signal lamp extending from (+), break contact of relay SL, make contact of relay POL and the lamp to (−).

When the operator answers the call by plugging into the line jack, relay SL is operated over the previously described circuit for substituting the windings of relay POL1 for the windings of relay POL, thus energizing the trunk circuit at a comparatively high level. This effects the operation of relay RCV in the two way trunk circuit and this relay in turn closes a circuit for operating relay RV extending from (+), make contact of relay RCV, conductor 9, make contact of relay OD and winding of relay RV to (−). The operation of relay RCV completes a locking circuit for relay OD extending from (+), make contact of relay RCV, conductor 17, break contact of relay HLD in the alarm sender, conductor 18, make contact of relay OD and winding of relay OD to (−). Since this circuit is independent of the C relay, the OD relay will be maintained operated in the case of an outgoing telephone call for keeping this trunk circuit busy until the operator takes down the connection and effects the release of relay OD as will be later described. The operation of relay RV reversed the battery back to the calling line for coin box, metering or supervisory purposes. Relay RRT is also operated at this time over a circuit extending from (+), make contact of relay RCV, conductor 9, make contact of relay OD, conductor 8, break contact and winding of relay RRT to (−). Relay RRT closes a locking circuit for itself extending from (+) on conductor 18, make contact of relay OD, conductor 6, make contact and winding of relay RRT to (−).

The energization of the trunk circuit at the comparatively high level is in the wrong direction for operating relay POL1. Consequently, when relay POL is switched out of the trunk circuit, as previously described, it releases for extinguishing the incoming lamp. The operation and locking of relay RRT opens up the circuit to the revertive ringing tone for disconnecting this signal from the calling line and maintaining it disconnected until the connection is released.

The operator now proceeds to handle the call and conversation takes place over the trunk in the conventional manner. When the calling party in the dial office hangs up the receiver to terminate this call, the opening up of the calling line effects the release of relay C which in turn effects the release of relay SY2 for restoring the direction of the current flow over the trunk circuit to normal. Since this energization of the trunk circuit is still at a comparatively high level, relay POL1 will operate and light the supervisory lamp as an indication that the calling party has hung up the receiver.

When the operator takes down the connection the removal of the plug from the line jack releases relay SL and this relay in turn switches the trunk circuit from relay POL1 to relay POL, thus releasing POL1 and reducing the energization to a comparatively low level. This effects the release of relay RCV in the two way trunk circuit and this relay in turn effects the release of relays RV and OD. The release of relay POL1 extinguishes the supervisory lamp and the release of relay OD of the two way trunk circuit removes (+) potential from sleeve conductor S for restoring the automatic equipment and relay SA of the alarm sender to normal. The release of relay OD opens up the locking circuit for relay RRT, all of which restores the circuit to normal condition ready for another connection.

It will now be explained how the alarm circuits function to transmit a distinctive signal to the manual position in the distant office in response to a trouble condition in the unattended office. Either the minor relay MI or the major relay MA will be de-energized in any well known manner when a minor or a major alarm condition exists in the unattended office.

Major and minor alarms may be caused, for example, by the blowing of major or minor fuses. The circuits for energizing MI and MA are indicated in Fig. 2 by dashed lines to (+). An example of typical circuits represented by these dashed lines can be inspected in Fig. 7 of Wicks Patent 1,901,068, issued March 14, 1933. Relay 705 in the Wicks patent corresponds to my relay MI, while Wicks relay 708 corresponds to my relay MA. Other faults within a step-by-step exchange against which it is customary to furnish protection are described at page 161, lines 7–25 of "Telephone Theory and Practice," vol. 3, by K. B. Miller. An example of another type of fault protection may be examined in Fig. 1 of Patent 2,315,378 to Powell, issued March 30, 1943. In this patent relay 14 is maintained energized unless one of the tens relays T1 through T10, sticks. Similarly, relay 23 is maintained energized unless one of the units relays. U1 through U10 (Fig. 5), sticks, thus developing a fault. In this specification, the word "fault" indicates an abnormal condition, i. e., actual breakdown of apparatus; it is not descriptive of such conditions as all trunks being busy or a switch going to overflow position.

The release of either MA or MI opens up and releases signal relay SIG. The release of relay SIG closes a circuit for operating relays L and LL of the alarm sender and relay C of the two way trunk circuit, the circuit extending from (+), upper winding of relay C, break contact of relay ID1, upper left hand winding of repeating coil RC, conductor 1, break contact of relay RV, break contact of relay SA of the alarm sender, winding of relay L, lower winding of relay LL, rectifier 2RE, conductor 12, break contact of relay SIG, conductor 13, break contact of relay RV, conductor 2, lower left hand winding of repeating coil RC, break contact of relay ID1 and lower winding of relay C to (−).

The operation of relay C closes a circuit for operating relay SY2 extending from (+), make contact of relay C, break contact of relay ID2 and winding of relay SY2 to (−). The operation of relay SY2 reverses the battery connection to the trunk to the distant office for operating polar relay POL and this relay in turn closes the previously described circuit for lighting the incoming lamp.

The operation of relay C also closes an obvious circuit for relay OD so that this last mentioned relay operates. Relay OD in operating prepares a locking circuit for itself over conductor 18, prepares a circuit for reversal relay RV and applies (+) potential to sleeve conductor S to make this trunk busy in the banks of the local selectors. Returning to the functioning of the alarm sender, relay LL operates in the above mentioned circuit to close at one of its make contacts a circuit for hold relay HLD which extends from (+), make contact relay OD, conductor S, make contact of relay LL and winding of slow release relay HLD to (−). At its uppermost contact relay LL closes a locking circuit to relay OD of the trunk circuit via conductor 18 and the top make contact of relay OD. Relay HLD in operating, at its uppermost break contact prevents the closure of the multiple locking circuit to relay OD which in the case of ordinary outgoing telephone calls is closed at the make contact of relay RCV upon answering as described hereinbefore. Slow to operate relay L in operating in the above traced circuit including conductors 1 and 2, causes the operation of the slow release relay SA in the following circuit: (+), make contact of relay HLD, make contact of relay LL, make contact of relay L, winding of relay SA to (−).

When relay SA operates in this circuit it closes a holding circuit for relay LL which extends from a make contact of relay HLD, make contact of relay LL, make contact of relay SA, and the upper winding of relay LL to (−). At its break contact relay SA also opens the above traced loop circuit including conductors 1 and 2 thereby causing the release of relays C and L. Relay C in releasing opens the circuit of relay SY2 which upon its release reverses the current over the trunk to the manual office so that polarized relay POL, Fig. 3, restores, thereby extinguishing the incoming and supervisory lamp.

In the alarm sender release of relay L brings about the restoration of relay SA which upon its release recloses the aforementioned loop circuit so that relays C and L reoperate. Relay L in operating again causes relay SA to open this loop circuit with the result that relays C and L will again restore. From this description it will readily be seen that relays L and SA act as a relay interrupter to cause the periodical release and operation of relay C in the trunk circuit. Consequently relays SY2, Fig. 2 and POL, Fig. 3, also are periodically released and operated and the incoming and supervisory lamp at the operator's position is caused to flash accordingly. While the circuit for the lower winding of relay LL also is intermittently opened, this last mentioned relay is held operated by means of its upper winding in the circuit traced above.

The cycle of operation of relays L and SA ordinarily will be fast enough so that outgoing relay OD of the trunk circuit will not release during the short intervals while relay C is released. However, even if this condition is not met relay OD will be held operated during the functioning of the alarm sender due to the application of a multiple ground to conductor 18 at the top contact of relay LL.

The flashing of the incoming and supervisory lamp serves as a distinctive signal to the operator, identifying the call to her as an alarm call. In response to this call the operator plugs into the line jack so that relay SL operates to open the circuit of the incoming and supervisory lamp and switching the trunk conductors from the windings of relay POL to those of relay POL1, thereby energizing the trunk circuit at a comparatively high level as in the answering of an outgoing telephone call. Relay RCV, Fig. 2, in operating in response to this high level energization of the trunk causes the operation of relay RV in the previously traced circuit. As explained in connection with the answering of a regular telephone call, relay RRT is operated in parallel with relay RV over conductor 8 but the operation of relay RRT performs no function at this time. Relay RRT locks to (+) potential on conductor 6. Relay RV at its make-before-break contacts reverses the polarity of the loop circuit extending to relay C over conductors 1 and 2, this loop circuit in the instant case also including relays L and LL as well as rectifier 2RE. Due to the presence of rectifier 2RE in this loop circuit the current flow over this circuit is cut off due to the aforementioned polarity reversal so that the windings of relays C and L and the lower winding of relay LL become de-energized. Should relay L be operated at this time this last mentioned relay will therefore release or if relay L happens to be in an unoperated condition the reoperation of this relay is thus prevented. As a result relay SA also will restore if it is not already in released condition. With the circuit of the upper winding of relay LL open at the make contact of relay SA, relay LL also restores. Relay LL in releasing closes another circuit for relay SA which extends from (+), make contact of relay HLD, break contact of relay LL, winding of relay SA to (−). Relay SA in reoperating, at its break contact opens the loop circuit and thus holds this circuit in inoperative condition independent of the condition of reversal relay RV. Relay LL also removes a multiple ground from the locking circuit of relay OD; places a multiple ground from a make contact of relay HLD on the sleeve conductor; and switches relay HLD into a holding circuit dependent on the operated condition of relay RCV, this circuit extending from (+), make contact of relay RCV, conductor 17, make contact of relay HLD, conductor 16, top break contact of relay SIG, conductor 11, break contact of relay LL and the winding of relay HLD to (−). It will be noted that with relay HLD in the alarm sender operated and relay LL released, relay SA is maintained operated so that with the loop circuit held open at the break contact of this last mentioned relay the alarm sender is now in a locked-out condition.

Due to the polarity reversal on the alarm calling loop incident to the operation of relay RV relay C, in releasing at its make contact causes another ground to be removed from the winding of relay OD. With ground removed both at the last mentioned make contact of relay RCV and the top make contact of relay LL, relay RRT is permitted to restore and outgoing delay relay OD also releases after a short interval. Relay OD removes a multiple ground from the sleeve conductor; opens the circuit of relay RV so that this relay restores the original polarity over the calling loop, this loop now however being held open at the break contact of relay SA, and closes the following circuit for incoming delay relay ID1: (+), make contact of relay RCV, conductor 9, break contact of relay OD, conductor 10 and winding of relay ID1 to (−). Relay ID1 upon operating closes the loop to the incoming selector as described above in connection with a manual to automatic call, thereby causing the operation of relay SY1 in a circuit extending over the talking conductors T and R to the incoming selector. Relay SY1 in operating in turn causes the operation of a relay ID2 in a circuit extending from the make contact of relay ID1, make contact of relay SY1 and winding of relay ID2 to (−). Relay ID2 locks to the make contact of relay ID1 and closes a spark protection circuit around the impulsing contacts of relay RCV all as described above in connection with a call from the operator to the automatic exchange.

When relay C released upon the reversal of the polarity of its circuit incident to the answering of the alarm call by the operator, it also opened at its lowermost make contact the circuit of relay SY2 so that this relay releases thereby restoring the direction of current flow over the trunk circuit to normal. As a result relay POL1, Fig. 3, operates to light the incoming and supervisory lamp at the operator's position as in the case of an incoming call from the operator to the automatic office. Furthermore, upon completion of the calling loop to the incoming selector as just described, dial tone is returned to the operator over the inter-office trunk. Upon hearing this one the operator inserts her dial plug into the dial jack, Fig. 3, so that relays S and SP operate as in the case of an ordinary call originated by the operator. Relay SP in switching the trunk conductors over to the operator's dial causes the release of polarized relay POL1 which at its make contact causes the incoming and supervisory lamp to be extinguished.

Returning again to the seizure of the incoming selector upon the operation of incoming delay relay ID1 it will be recalled from the description of an ordinary incoming call that (+) is applied to the sleeve conductor at the incoming selector to render the trunk circuit busy to outgoing calls. As, in the case of an outgoing alarm call, this (+) is returned from the incoming selector only some time after the removal of (+) from conductor S at the make contact of the outgoing delay relay OD, there would be a short interval during which this trunk circuit is unguarded with respect to outgoing calls. This is prevented by the above mentioned multiple ground applied to the sleeve conductor at the make contact of relay HLD, which ground bridges any existing gap in the guarding of the trunk circuit.

It will be noted from the foregoing description that while in an outgoing telephone call relay OD is held operated under the joint control of line relay C on the automatic end of the repeater and line relay RCV on the manual end of the trunk circuit, relay OD in the case of an alarm call is permitted to restore upon the mere disabling of the automatic end of the connection upon the answering of a call by the operator. In this way the trunk circuit incident to the mere answering of the call by the operator is switched from its outgoing condition to its incoming condition whereby the operator may dial the alarm checking number back over the alarm trunk itself without first withdrawing from the trunk.

After inserting the dial plug into the dial jack as mentioned above, the operator now proceeds to dial the alarm checking number into the incoming selector and the succeeding switching equipment of the automatic exchange. When the connector, the banks of which are indicated in the left-hand portion of Fig. 1, seizes this number, sleeve conductor S is energized for operating trunk relay T. Relay T applies (+) potential to the common generator and tone start conductor for starting the tone mechanism operating. Relay T also applies (+) potential to conductor 15 to re-set the alarm circuit as will be described in greater detail hereafter. Relay T also connects neon tube NT across the tip and ring conductors T and R associated with the alarm checking number at the connector banks for tripping the ring. Since tube NT will not pass sufficient current to operate the usual reverse battery relay on the called end of the connector the battery is not reversed back to the calling line on a call of this class.

In the event of a minor alarm relay MI will be released and the operator will hear the busy tone over a circuit extending from the common busy tone conductor, break contact of relay MI, make contact of relay MA, conductor 14, condenser C3 and lower winding of tone coil TC to (−). This tone is induced into the upper winding of coil TC and since this winding is connected to the tip and ring conductors of the alarm checking number through the condenser C4, the operator will hear the tone. In the event of a major alarm, relay MA will be released and when the operator dials this checking number no tone will be received because the lower winding of relay TC is connected to an open circuit at the uppermost break contact of relay MA. If there is no trouble condition existing when the alarm checking number is dialed, for instance because the condition causing the operation of the alarm sender has been removed in the meantime as more fully described below, then both the major relay MA and the minor relay MI will be operated and the operator will hear generator tone extending from the common generator tone source, make contact of relays MI and MA in series and over the previously described circuit including tone coil TC. If in the case just assumed relay SIG is in operated condition, application of (+) to conductor 15 at the lowermost make contact of relay T will prevent the release of relay SIG, due to an alarm condition arising at this time, for the duration of the alarm checking connection.

In the event that one or both alarm relays MA and MI is released when the alarm checking number is dialed, the operation of relay T applies (+) to the lower break contact of relay SIG and the break contact of the MA or MI relay to the winding of the MAL or the MIL relay to (−). The operation of either one of these latter relays closes an obvious locking circuit for itself by way of its other winding so that relay MAL or MIL stays operated until relay MA or MI reoperates upon the removal of the trouble. The operation of either relay MAL or MIL extends (+) to the winding of relay SIG for reoperating this relay. Upon operating relay SIG at its bottom make contact locks to the lowermost make contact of relay T so that release of relay SIG is prevented while the operator holds the alarm checking connection. Thus relay SIG is held operated under the joint control of relay MAL or MIL and relay T. At one of its break contacts relay SIG upon operating also opens another point in the calling loop of the alarm sender which extends over conductors 12 and 13. At its top break contact relay SIG opens the locking circuit for relay HLD of the alarm sender so that this relay releases. At its top break contact relay HLD restores the locking circuit for relay OD to the control of the make contact of relay RCV as required for an outgoing telephone call; and at a break-make contact switches the sleeve conductor from (+) at the make contact of relay HLD to the winding of relay SA so that the latter relay remains operated in spite of the operation of relay HLD, namely, from (+) which is still returned over the S conductor from the incoming selector used in the alarm check connection. The alarm calling loop therefore will be held open at the break contact of relay SA until the operator takes down the alarm checking connection.

At this point it may be mentioned that when the trunk circuit is seized in an outgoing or incoming telephone call with the alarm sender at normal, (+) applied to the sleeve conductor upon seizure of the trunk circuit as mentioned above, also will through the operation of relay SA from this (+) result in the alarm calling loop being held open at the break contact of relay SA. In this manner the actual transmission of an alarm is delayed until the trunk circuit shown in the drawing has become idle upon the termination of the telephone call just referred to.

Reverting to the resetting of the alarm circuit incident to the dialing of the alarm checking number on the part of the operator, it will be clear that when the alarm condition is subsequently removed relay MA or MI, whichever was released, reoperates. Consequently the locking circuit of relay MAL or MIL, as the case may be, is opened and relay MAL or MIL releases the alarm circuit shown in Fig. 2 which is thus returned to its normal condition.

It will now be assumed that the operator upon answering an alarm call withdraws from the trunk without dialing the alarm checking number. This may occur, for example, if the operator for some reason fails to identify the call received by her as an alarm call.

Before the operator thus withdraws her plug from the line jack, the following relays are in operating condition: relays SL and POL1 at the manual end, Fig. 3, of the trunk circuit; relays RCV, ID1, SY1 and ID2 at the automatic end, Figs. 1 and 2 of the trunk circuit; and relays HLD and SA in the alarm transmitter, Fig. 1. If now the operator withdraws the plug from the line jack relay SL releases reducing the current flow over the trunk conductors to a point where relay RCV, Fig. 2, restores. Relay RCV in releasing causes the operation of relay CHO but this operation is without effect at this time. The release of relay RCV also causes the successive release of relays ID1 and ID2, this latter relay restoring relay CHO back to normal. Relay RCV upon its release also opens the loop to the incoming selector so that relay SY1 releases and multiple (+) is removed from the sleeve conductor at the incoming selector. Relay RCV in releasing, at its make contact finally opens the locking circuit of relay HLD in the alarm sender which circuit as will be recalled extends from (+), make contact of relay RCV, conductor 17, make contact of relay HLD, conductor 16, break contact of relay SIG, conductor 11, break contact of relay LL and winding of relay HLD to (−). At its bottom make contact relay HLD upon restoring opens the circuit to relay SA and this relay in releasing, at its break contact recloses the alarm calling loop which had previously been prepared at the break contacts of relay ID1. As a result relays LL, L and C reoperate and the intermittent release and operation of relays L, C and SA is resumed to cause the incoming and supervisory lamp, Fig. 3, to be flashed again as above described. From the foregoing it will be clear that if the operator retires from the alarm trunk without taking further action by dialing the alarm checking number, the distinct alarm signal will be displayed all over again as in a new alarm call. The operator will thus be reminded of the existence of the alarm condition.

It may happen that the alarm condition for some reason is removed before the operator has dialed the alarm checking number. In this connection two conditions may be distinguished. Assuming first that the trouble condition ceases to exist while the alarm sender is in its transmitting condition, reoperation of relay MA or MI will cause relay SIG to reoperate. With relay SIG released a point in the alarm calling loop extending over conductors 12 and 13 is opened as above described so that relays L, SA and C release or are prevented from reoperating in their cycle of operation. Under this condition relay LL also restores as explained hereinbefore and relay HLD releases due to its locking circuit being opened at the top break contact of relay SIG. With relays C and LL restored, relay OD also releases. With (+) removed from the sleeve conductor at the make contact of relay OD, relay SA in the alarm sender which in the meantime had reoperated over the break contacts of relays LL and HLD in series, also restores. The release of relay C also causes relay SY2 in the trunk circuit to release so that the current over the trunk circuit is restored to its normal direction and the manual end of the trunk also returned to normal.

On the other hand, should the trouble condition cease to exist subsequent to the answering of the alarm call by the operator, that is, while the alarm sender is in its locked out condition, reoperation of relay MA or MI in the alarm circuit will cause relay SIG to be reoperated as mentioned before. Under this condition relay HLD in the alarm sender is released due to its circuit being opened at the uppermost break contact of relay SIG; and relay HLD in releasing, at one of its break contacts closes a holding circuit for relay SA from (+) on the sleeve conductor, thus preventing the transmission of a new alarm until the operator has taken down the connection.

While the circuit illustrated in the drawings is particularly useful in permitting the operator to dial the alarm checking number back over the alarm trunk it should be noted that the operator may dial this number also over another trunk inter-connecting the automatic and manual office if she so desires. In this case the inter-office trunk used by the operator for dialing the alarm checking number functions as in the case of a call to the automatic office originated by the operator. In this instance when relay T operates upon completion of the alarm checking connection relay SIG operates and locks as described hereinbefore. This stops the operation of the alarm sender and the flashing of the incoming and supervisory lamp associated with the manual end of the alarm trunk.

While I have shown and described a particular embodiment of my invention, it will be obvious to those skilled in the art that changes and modifications such as those indicated above may be made without departing from my invention in its broader aspects. I therefore aim in the appended claims to cover all such changes and modifications as fall within the true spirit and scope of my invention.

What I claim is:

1. In a telephone system, an unattended exchange, a subscriber's station in said unattended exchange, an alarm circuit, an alarm sender in said unattended exchange effective to transmit an alarm responsive to said alarm circuit being in operative condition, an attended exchange, an operator in said attended exchange, a trunk inter-connecting said exchanges, means in said unattended exchange operative in response to the initiation of a telephone call from said subscriber's station to said attended exchange to cause the transmission of a calling signal of one kind over said trunk and operative in response to the operation of said alarm sender to transmit a calling signal of a different kind over said trunk, means in said attended exchange responsive to an answering operation by the operator to return the same kind of supervisory signal over the trunk regardless of the type of call and responsive to a disconnect operation by the operator to return a disconnect supervisory signal over the trunk, and means in said unattended exchange responsive to said answering supervisory signal if said call is an alarm call to cause the operation of said alarm sender to be interrupted and responsive to the receipt of said disconnect signal to cause the operation of said alarm sender to be resumed provided the alarm circuit is still in operative condition.

2. In a telephone system, an unattended exchange, a subscriber's station in said unattended exchange, an alarm circuit, an alarm sender in said unattended exchange controlled by said alarm circuit, an attended exchange, an operator in said attended exchange, a two-way trunk interconnecting said exchanges, a two-way trunk circuit terminating said trunk in said unattended exchange, said trunk circuit having at its unattended end a branch circuit for calls outgoing from said unattended exchange and a branch circuit for calls incoming to said unattended exchange, switching means for extending an outgoing call from said subscriber's station to said outgoing branch circuit, means associated with said outgoing branch circuit and operative in response to the initiation both of a call from said subscriber's station and a call from said alarm sender to cause said call to be extended over said trunk, means associated with the attended exchange end of said trunk circuit and operative in response to the initiation by the operator of a call to said unattended exchange to cause said call to be extended over said incoming branch circuit, said first and second mentioned means being effective, in the case of a call outgoing from said subscriber's station, jointly to hold said switching means from said outgoing branch circuit until both said first and second mentioned means have released at the termination of the call, disabling means responsive to the operation of said second mentioned means upon the answering by the operator of an outgoing alarm call to render said alarm sender and said first mentioned means inoperative, said first mentioned means being effective upon its release under the control of said disabling means to cause said trunk circuit to be switched from said outgoing to said incoming branch circuit, thereby to enable the operator to establish an alarm checking connection to said alarm circuit via said incoming branch circuit without first withdrawing from said trunk.

References Cited in the file of this patent

UNITED STATES PATENTS

| | | |
|---|---|---|
| 1,901,068 | Wicks | May 14, 1933 |
| 2,262,595 | Walters | Nov. 11, 1941 |
| 2,348,198 | Evers et al. | May 9, 1944 |
| 2,552,780 | Hadfield | May 15, 1951 |
| 2,584,857 | Frankel | Feb. 5, 1952 |